Dec. 18, 1962   J. W. BORGER ET AL   3,069,207
APPARATUS FOR UNLOADING BULK MATERIALS FROM HOPPER CARS
Filed Jan. 12, 1960   6 Sheets-Sheet 4
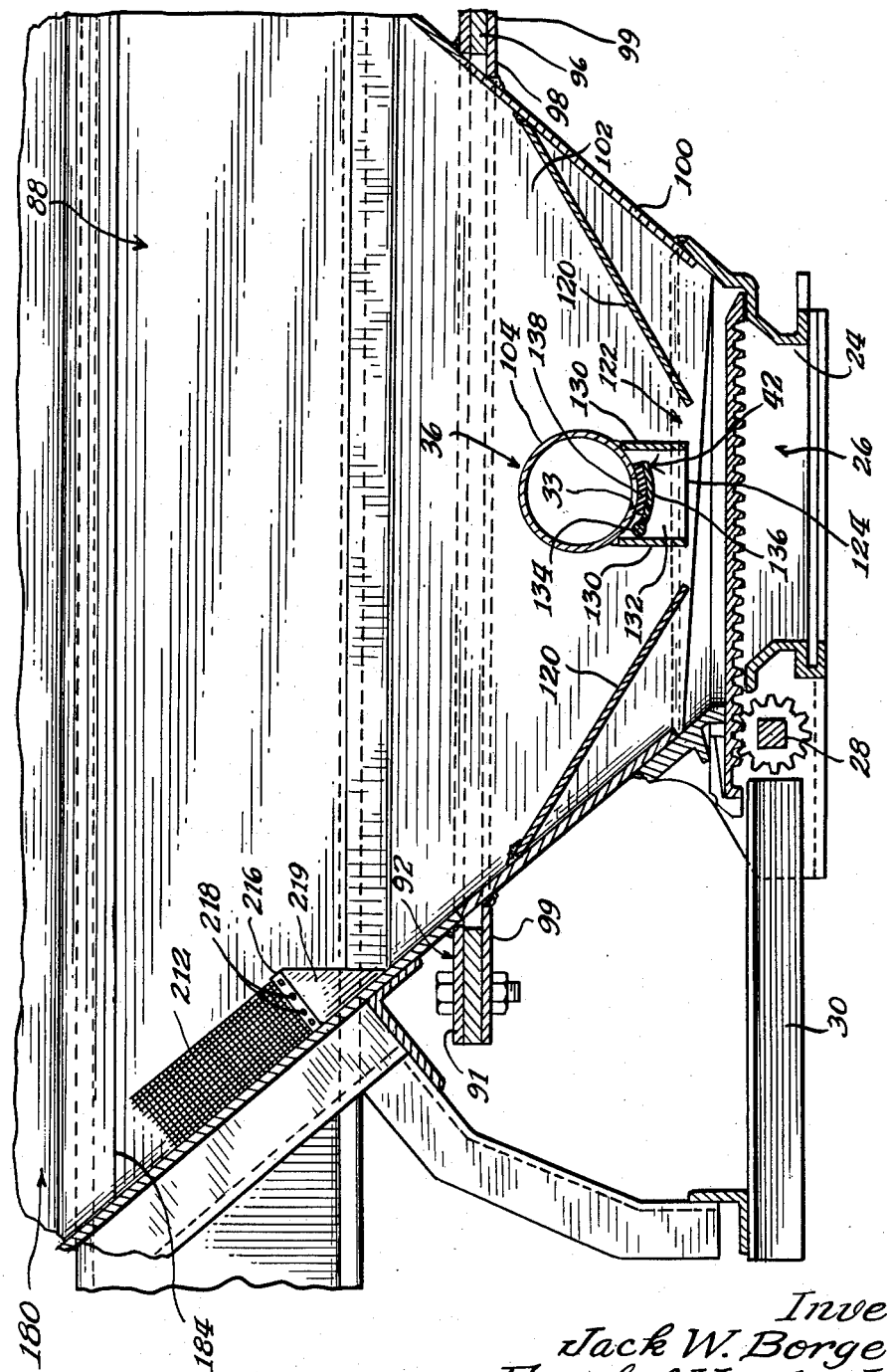
Inventors
Jack W. Borger and
Frank A. Vander Linden
By Mann, Brown and McWilliams,
Attys.

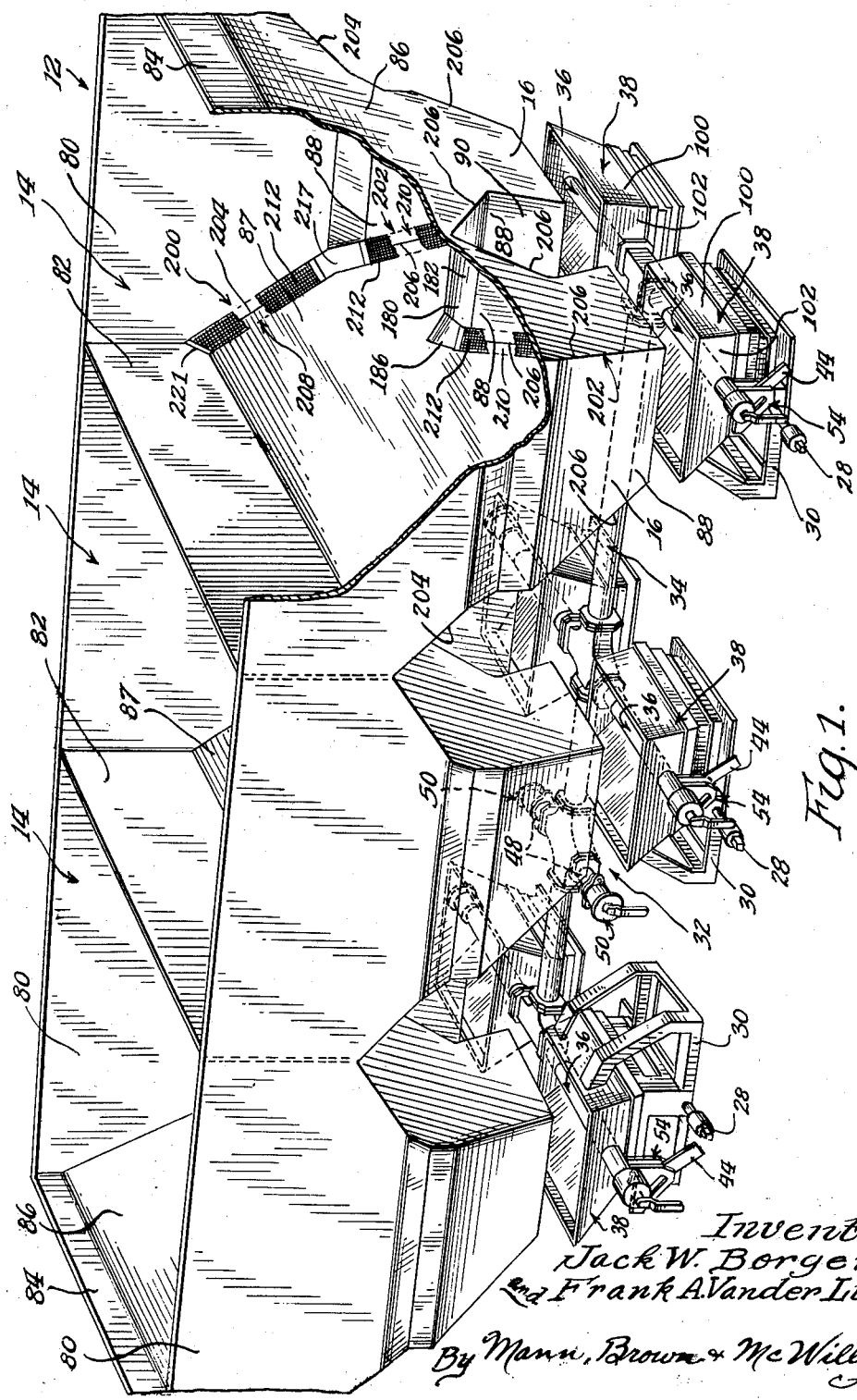

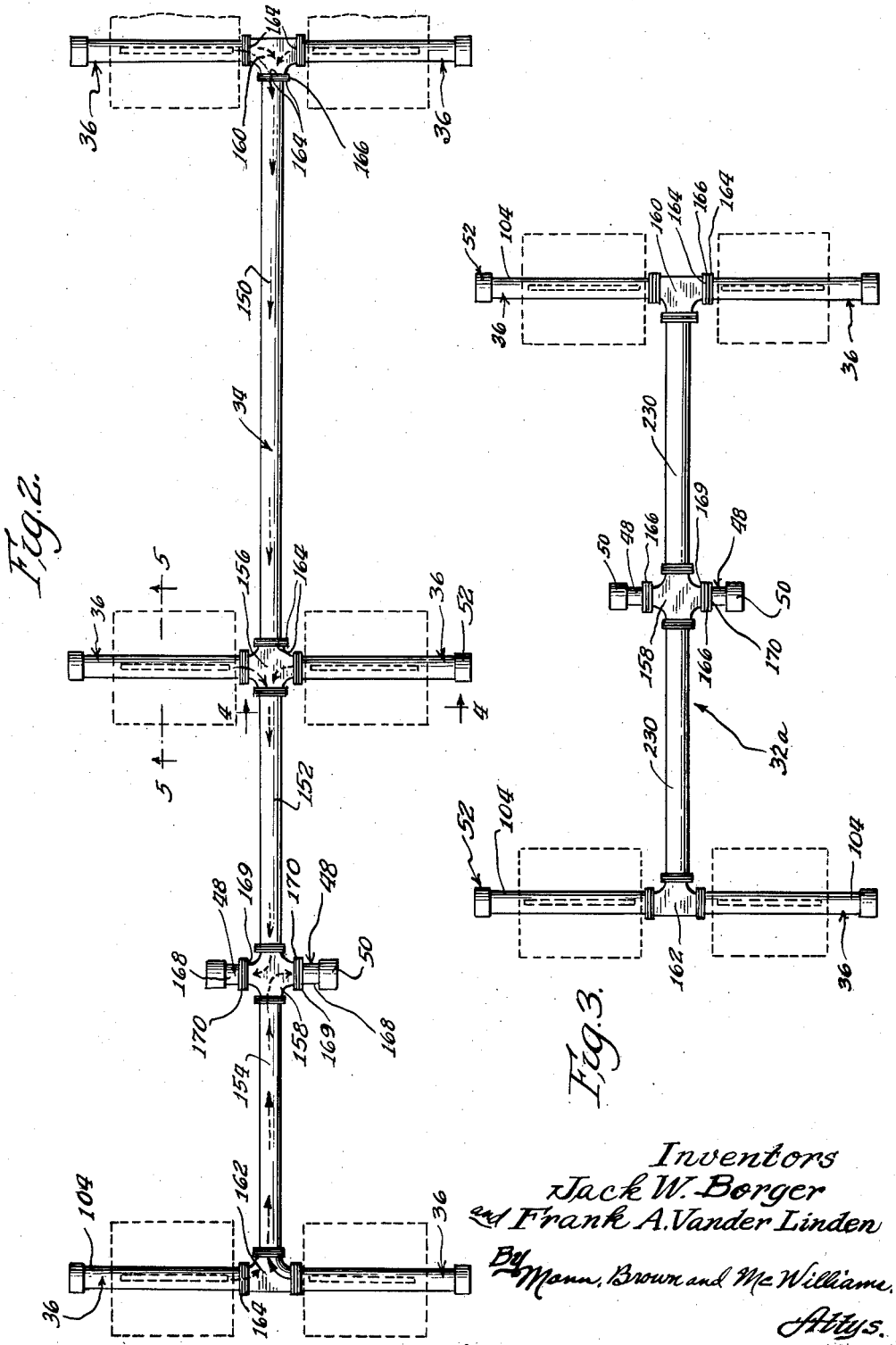

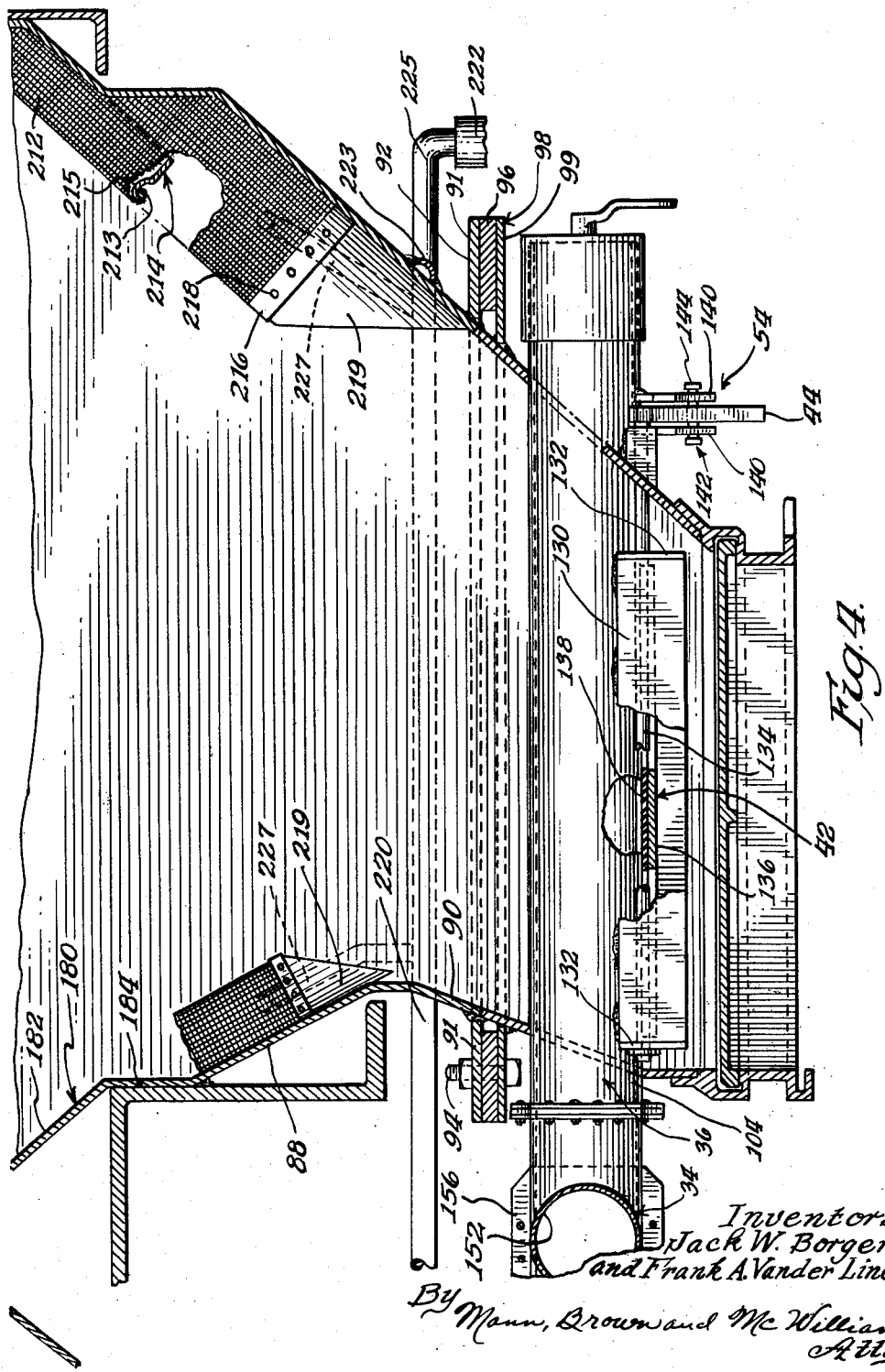

Dec. 18, 1962  J. W. BORGER ET AL  3,069,207
APPARATUS FOR UNLOADING BULK MATERIALS FROM HOPPER CARS
Filed Jan. 12, 1960  6 Sheets-Sheet 5
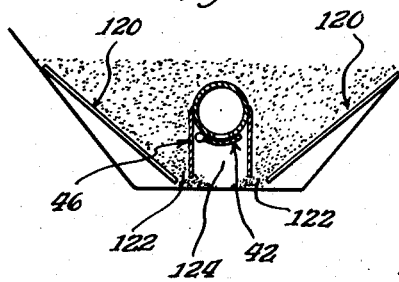
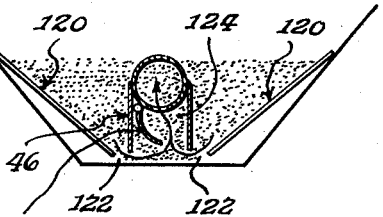
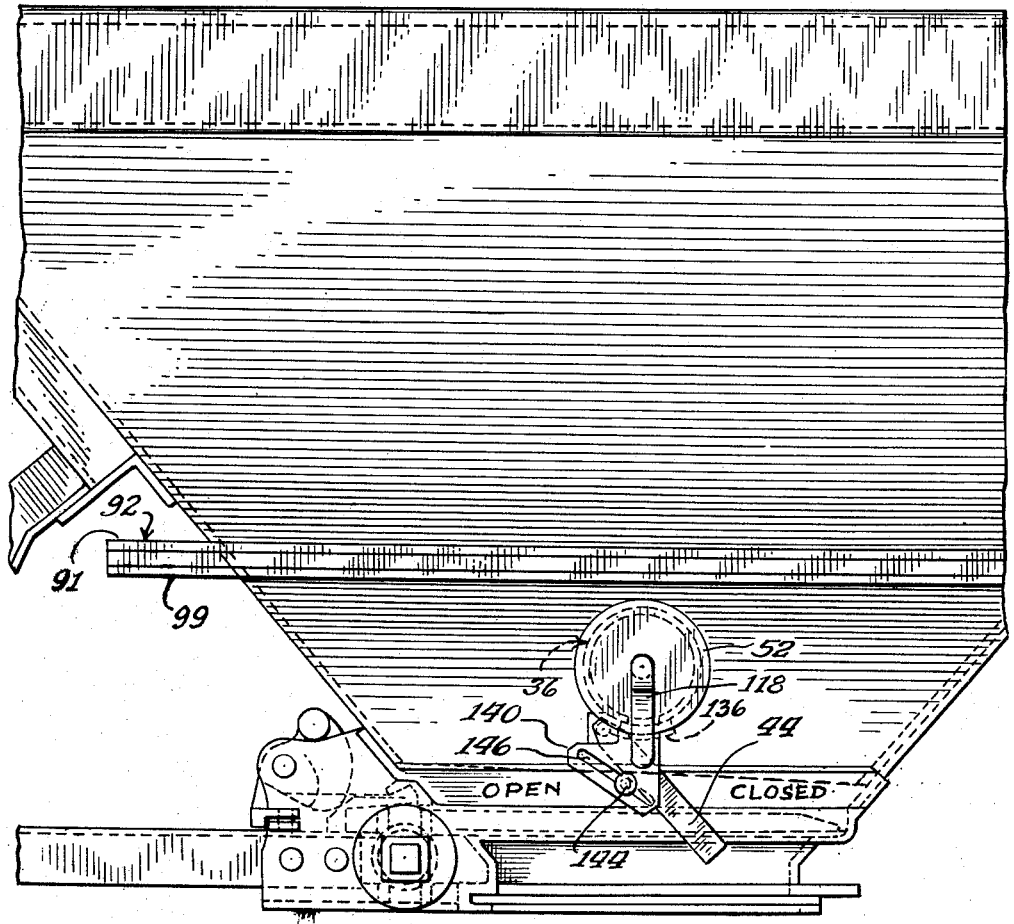
Inventor
Jack W. Borger
and Frank A. Vander Linden
By Mann, Brown and McWilliams
Attys.

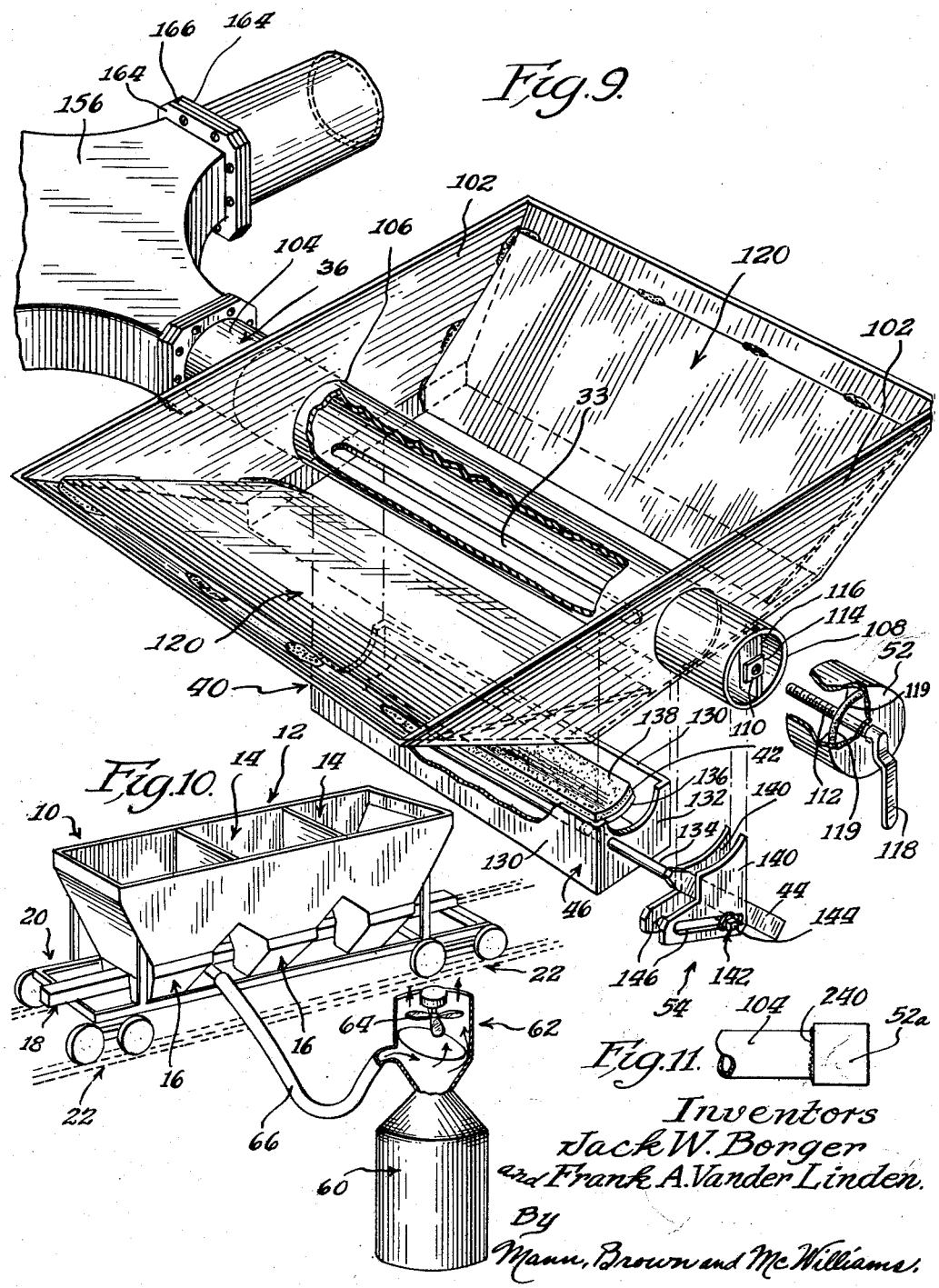

United States Patent Office 3,069,207
Patented Dec. 18, 1962

3,069,207
APPARATUS FOR UNLOADING BULK
MATERIALS FROM HOPPER CARS
Jack W. Borger, Calumet City, and Frank A. Vander
Linden, Chicago, Ill.
Filed Jan. 12, 1960, Ser. No. 2,075
13 Claims. (Cl. 302—52)

Our invention relates to unloading of bulk materials from hopper cars, and more particularly, to apparatus for and a method of unloading granular materials, such as malt and grains, from hopper structures, particularly of the type found in covered hopper railroad cars.

Bulk materials such as malt, grain, rice, or wheat, are conventionally shipped in hopper cars that are covered and sealed to keep the commodity dry and free from impurities while in transit. Such cars generally include two or more contiguous hoppers each formed with a pair of funnel-shaped portions that are disposed on either side of the car center sill and terminating in outlet ports which are closed by suitable gates.

The bulk materials handled by these special hopper cars (known to the industry as covered hopper cars) are customarily loaded and unloaded pneumatically. Manifestly, the volume of materials required to make bulk shipments economically feasible creates special problems of unloading, in view of the difficulty of getting at such materials once they are in the confines of a covered hopper car and the need for transferring such materials from the car to a storage hopper in the least possible time.

Early forms of pneumatic unloaders for emptying covered hopper cars consisted essentially of a portable unit which was formed to fit over a hopper gate and together with suitable flexible conduiting provided the necessary communication between the car interior and a source of suction that drew the bulk materials from the car and carried them to a suitable point of disposal, usually alongside the tracks on which the car rested. Each hopper had to be unloaded separately with this arrangement, and, of course, no unloading could take place unless the complete unloading apparatus was available at the lading's destination.

Later, the individual hoppers of a hopper car were provided with permanent conduiting adjacent the hopper gates so that the flexible conduit of a suitable blower apparatus could be connected to the individual hoppers to effect the load discharging action desired.

One such form of arrangement employs separate conduiting for each hopper opening extending crosswise of each opening and longitudinally of the car; one end of the conduiting is adapted to be connected to the flexible suction providing conduit while the other end is provided with a valve arrangement for purposes of giving a "controlled mixture" type of discharge. Thus, each hopper funnel-shaped portion has to be separately discharged with this type equipment, and, the valve arrangement is intended to act as an intentional leak to supply ambient air to the discharge action provided. The reason for this is that the suction required to lift the bulk material from the level of the hopper gates to a point of disposal, which usually is at a position well above the track level, is totally applied to a single hopper opening and thus frequently causes choking of the hopper gate, which stops all material flow from the car. The intentional air leak provided is made sufficient to reduce the actual suction acting on the bulk material below that which is likely to cause choking.

A second form of unloading arrangement that has been proposed is generally the same as described immediately above except that the conduiting for each hopper opening extends transversely of the car, and connects the two funnel-shaped portions of each hopper so that the two hopper openings may be unloaded at one time. However, the conduiting of this arrangement has been found to require an awkward hose connection at the side of the car, particularly where the car stands next to a building positioned a few feet from the track. Furthermore, this arrangement still requires the aforementioned "controlled mixture" type discharge action due to the tendency to choke, thus in effect wasting an important part of the suction action provided.

A known defect in all previously proposed pneumatic unloading arrangements for unloading covered hopper cars is that they all require some manual cleaning of the car to completely discharge it, as even the maximum suction available is not effective to withdraw some residue due to the escape of air through the hoppers into the suction system in the end of the discharge operation.

It is therefore a principal object of this invention to provide apparatus for unloading bulk goods from covered hopper cars which enables all hoppers to be unloaded simultaneously from a single discharge point and does not require the aforementioned "controlled mixture" type discharge.

A further object of the invention is to provide an unloading arrangement for covered hopper cars which materially reduces manual car cleaning problems.

Other objects of the invention are to make provision for substantially reducing the number of car seals required for a covered hopper car, to provide a covered hopper car arrangement that will handle both granular and pulverant materials, and to provide an unloading arrangement which contemplates both the separate unloading of individual hopper outlets or the unloading of all hopper outlets simultaneously.

Yet another object of the invention is to provide an unloading arrangement and method for covered hopper cars that require only minor modifications of existing car structures.

Still other and further objects, uses and advantages will become obvious or be apparent from a consideration of the following detailed description and the application drawings.

In the drawings:

FIGURE 1 is a diagrammatic perspective view illustrating the invention applied to the hopper structure of a covered hopper car, the conventional railroad car details usually asociated with such hopper structure, such as the car roof and underframe, being omitted for clarity of illustration;

FIGURE 2 is a diagrammatic plan view illustrating the conduiting employed in the hopper car structure shown in FIGURE 1;

FIGURE 3 is a view similar to that of FIGURE 2 but showing the conduiting that may be employed in a two hopper railroad car construction;

FIGURE 4 is a diagrammatic cross-sectional view of an enlarged scale substantially along line 4—4 of FIGURE 2, but illustrating the associated railroad car structures in addition to the conduiting shown in FIGURE 2;

FIGURE 5 is a cross-sectional view along line 5—5 of FIGURE 2, also illustrating the associated railroad car structure in addition to the conduiting of FIGURE 2;

FIGURE 6 is a side elevational view of the lower portion of one of the hoppers shown diagrammatically in FIGURE 1;

FIGURES 7 and 8 are diagrammatic cross-sectional views similar to that of FIGURE 5, but simplified to illustrate one of the basic concepts of this invention;

FIGURE 9 is a diagrammatic perspective view, partially exploded, illustrating the manner in which the invention is applied to one of the hopper structures shown in FIGURE 1;

FIGURE 10 diagrammatically illustrates a covered hopper car structure of the type to which the invention is adapted to be applied, together with a suitable arrangement for supplying suction to the unloading apparatus of the invention; and FIGURE 11 is a fragmental elevational view illustrating a modified form of the invention.

*General Decription*

Reference numeral 10 of FIGURE 10 generally indicates a covered hopper car of the type to which the invention is applicable, the car roof being omitted for simplicity of illustration. The car 10 includes a hopper structure 12 including a series of contiguous hoppers 14 that are each provided with spaced funneling portions 16 at their lower ends which are positioned on either side of the car center sill structure 18. The hopper structure 12 may be carried by any suitable form of railroad car bed or underframe 20 which may include center sill structure 18 and which rides on trucks 22 in the customary manner.

The hoppers 14 are conventionally provided with an outlet port 24 (see FIGURE 5) closed by a gate 26 of a conventional type which is actuated by applying a suitable wrench to operating rod 28 which is keyed to the gate by means of a suitable gearing illustrated in FIGURE 5. Gate 26 is shown in its closed position in FIGURE 5 and is moved to the left of FIGURE 5 along tracks 30 to open the hopper outlet for discharge purposes. The gate arrangement of FIGURE 5 would customarily be employed when the car 10 is arranged to carry and discharge pulverant material in accordance with the invention described in copending application Serial No. 796,603 filed March 2, 1959, by Jack W. Borger, the disclosure of which is hereby incorporated herein by this reference.

In accordance with the present invention, the funneling portions 16 of the hopper structure 12 are interconnected by pneumatic unloading apparatus 32, which includes a central, trunk, or gathering conduit 34 having connected thereto a plurality of feeder conduits 36 that extend crosswise of the lower ends of the respective hopper filling portions 16 and transversely of the car. In the form illustrated in FIGURE 1, the feeder conduits 36 are secured to detachable adapter structures 38 which may be secured in any suitable manner to the respective funneling portions 16. The adapter structures 38 also carry the gate structure 26.

The feeder conduits 36 each take the form of a tubular member 30 formed with an elongate orifice opening 33 in the underportion thereof, which is opened and closed by valve structure 40, which includes a valve member 42 that may be moved toward and away from orifice opening 33 by an appropriate operating handle 44. In accordance with this invention, the valve member 42 is encompassed by a circumambient wall structure 46 which, as indicated in FIGURES 7 and 8, is provided to prevent the granular material in the hopper from interferring with the operation of the valve member.

Trunk line 34 is provided with discharge conduits 48 (see FIGURE 2) which respectively extend short of either side of the car, as indicated in FIGURE 2. Removable caps 50 are applied to discharge conduits 48 and similar caps 52 are applied to the ends of feeder conduits 36. Caps 50 and 52 are arranged so that when they are in place on the ends of their respective conduits, they seal off the respective conduit ends against air leakage. Valve members 42 are arranged to provide a like action at the respective orifices 33.

In use, caps 50 and 52 and valve members 42 are positioned to close off the trunk and feeder conduits of the unloader apparatus except when a hopper car 10 is to be unloaded. A special wedge lock device 54 is provided to hold the respective valve members in the closed position. The hopper structure 12 is loaded in the usual manner through the roof hatches of the hopper car, which are thereafter sealed for transit, as are the individual caps 50 and 52. When it is desired to unload granular material from the car 10, and assuming that the entire car is to be unloaded, the car is first positioned adjacent the desired storage hopper structure, which is diagrammatically shown at 60 in FIGURE 10 and which usually has associated therewith a suitable blower apparatus generally indicated at 62 that provides the suction required to draw the granular material from the railroad car 10 into storage hopper 60. The blower apparatus includes impeller 64 that is actuated in any suitable manner to force air in the direction of the arrows of FIGURE 10, and a flexible hose 66 which is conventionally arranged for connection to hopper car unloaders and may be adapted for connection to unloader apparatus 32.

In accordance with our invention, flexible hose 66 is attached in any suitable manner to the adjacent conduit 48 of trunk conduit 34, after its cap 50 has been removed. The valve members 42 may then all be moved to the open position of FIGURE 8. Also, a roof hatch of each hopper should be opened and the opened hatches may be covered with cloth for precluding the entry of materials that will contaminate the lading.

Blower apparatus 62 may then be turned on and this simultaneously applies suction to all the hopper funneling portions 16 and draws the granular material in the direction suggested by the arrows of FIGURES 2 and 8. All that now need be done is to wait until the respective hoppers empty, after which the hopper valve member 42 of the empty hopper should be closed tightly to prevent excessive entry of air into the vacuum system.

After the car is fully unloaded, the hose 66 is removed from the conduit 48 and its cap 50 restored, after which the car is ready to receive another load of granular material (as in the case of car 10) or pulverant material.

*Specific Description*

The railroad car 10, aside from the inventive concepts herein disclosed, may be essentially the same as the PS–2 covered hopper car made and sold by Pullman-Standard, a division of Pullman Incorporated. The hopper structure 12 in the embodiment of FIGURES 1, 2 and 4–10, is formed into three hoppers 14 defined by vertical side sheets 80, vertical partitions 82, and end sheets 84, which merge into sloping floor sheets 86 and 87 and hopper sheets 88. The floor sheets 87 extend between partition sheets 82 and the hopper openings, to which the hopper sheets 88 and floor sheets 86 also converge. The hopper sheets 88 on either side of the car center sill define with the floor sheets 86 and 87 the funneling portions 16 of the respective hoppers.

As already indicated, the hopper structure 12 and sheets thereof may be secured to the car underframe in any suitable manner, and this is customarily done by welding. In the specific hopper structures illustrated, the hopper sheets 88 at the center sill side of the respective hopper funneling portions include the conventional inwardly angled portions 90 (see FIGURE 4) and each hopper funneling portion 16 is provided with an encompassing flange 92 (omitted from FIGURE 1 for clarity) formed by suitable plates 91 fixed in coplanar relationship to the respective hopper sheets, to which adapter structure 38 may be fixed by appropriate bolts 94 (see FIGURES 4 and 5). A suitable gasket 96 may be interposed between the flange 92 and a corresponding flange 98 (likewise formed by suitable plates 99) of the respective adapter structures.

The adaper structures 38, made up of end sheets 100 and side sheets 102 which are proportioned and secured together to act as continuations of the respective hopper sheets and floor sheets. The lower end of the gate structure 38 forming the hopper outlet 24 may be formed as necessary and desirable to operably mount conventional gate 26 and its actuating and supporting devices.

The feeder conduits 36 each comprise a tubular member 104 appropriately fixed in openings 106 formed in the adapter structure sheets 102, as by welding, and extending across the adapter structure. The orifice opening 33 is formed in the underside of each tube 104. The outwardly extending ends of the respective tubes 104 fixedly carry a nut structure 110 (see FIGURE 9) aligned with the axial center of the tube which receives a screw threaded member 112 fixed to the axial center of cap 52. The nut structure 110 may comprise a nut 114 fixed to bar 116 which is welded within the outer end 108 of tube 104. The caps 52 preferably each have a suitable operating handle 118 affixed thereto and have mounted therein annular seal 119 that is engaged by the end of tube 104 when the caps are turned to the fully closed position.

As best shown in FIGURES 5 and 9, each adaptor structure 38 includes a pair of baffle plates 120, which are disposed transversely of the car and are inclined downwardly in the direction of the hopper opening 24. Plates 120 may be welded to the adapter structure forming plates 110 and 102 substantially as indicated in FIGURE 9 and are preferably positioned with respect to the wall structure 46 (that encompasses orifice opening 33) to define restricted passages 122 of limited width. The baffle plates 120 together with the wall structure 46 insure that the valve member 42 will be unobstructed when it is desired to open same since they will not permit the lading to build up within the space 124 encompassed by wall structure 46.

Wall structure 46 in the form illustrated is of quadrilateral box-like configuration including elongate side walls 130 and relatively short end walls 132 appropriately fixed to the underside of tube 104, as by welding. Valve member 42 is fixed to an operating rod 134 that is journalled in end walls 132 of the wall structure 46 and rod 134 has fixed at its outwardly projecting end the operating handle 44.

As indicated in FIGURES 5 and 9, the valve member 42 may comprise a lower arcuate plate 136 having fixed to its upper concave surface an arcuate gasket 138 formed from a suitable gasketing material, such as rubber. Gasket 138 and valve member 136 should be made of sufficient length to be coextensive with the orifice opening 32.

Wedge lock device 54 is associated with each operating handle 44 and in the form illustrated each device 54 comprises a pair of spaced substantially identical bracket-forming plates 140, which may be welded to the underside of the tube 104 adjacent its end 108, in the case of each hopper funneling portion. The handle 44 operates between the spaced plates 140 and rests against a wedge-forming member 142 in the form of bolt 144, which is mounted in and extends between identical downwardly inclined slots 146 that are formed in the respective plates 140.

As indicated in FIGURE 6, in the closed position of valve member 42, the operating handle 44 is at its maximum position of elevation, and further, the eccentric mounting of valve member 42 places a substantial downward bias on operating handle 44; this wedges bolt 144 against movement in its slots 146, particularly when valve member 42 is in its closed position (wherein handle 44 is almost parallel to slots 146). Thus, when moving valve member 42 from open to closed position, bolt 144 follows handle 44 and moves downwardly in slots 146. Due to the wedging action on bolt 144 provided by the bias on the handle 44, handle 44 may be held in any desired position, and particularly in the closed position of FIGURE 6. To move the valve member 42 to the position of FIGURE 8, the bolt 144 is moved upwardly into the left of FIGURE 6 so that the handle 44 may move downwardly in a clockwise direction; it will be held in open position by gravity.

The trunk conduit 34 in the form of FIGURES 1, 2 and 4–10, is composed of three tubular members 150, 152 and 154 connected together by transition pieces 156 and 158. End transition pieces 160 and 162 are fixed to the respective ends of tubular members 150 and 154.

The tubular members 104 forming the feeder conduits are fixed to the respective transition pieces in the manner indicated in FIGURE 2. As also indicated in FIGURE 2, the tubular members 104, 150, 152, 154 and the transition pieces or members are flanged as at 164 so that they may be bolted together. As indicated in FIGURE 9, an appropriate gasket 166 may be interposed between the respective tubular member flanges.

The discharge conduits 48 may take the form of short tubular members 168 each having one end flanged as at 169 for attachment to an appropriate flange 170 of the transition piece or member 158. Flanges 169 and 170 may be bolted together and have a gasket 166 interposed therebetween as in the case of flanges 164.

The outwardly projecting ends of tubular members 168 preferably are provided with a nut structure 110 similar to that shown in FIGURE 9 and caps 50 are identical with caps 52.

The operation of the unloader apparatus has been previously described but it may be mentioned that baffle plates 120 in forming the restricted openings 122 insure that all of the granular material above openings 122 will be drawn below openings 122 before there is any appreciable escape of air through these openings 122. The rest of the granular material may be removed from the hopper by merely opening the gate 26.

Of course, the center sill structure 20 may be provided with an appropriate covering saddle or ridge structure to insure that the bulk material does not remain on top of the center sill. One such form is indicated at 180 in FIGURE 1 and comprises a suitable sheet 182 welded to the center sill as at 184 (see FIGURE 4) and provided with suitable transition pieces 186 at its ends (see FIGURE 1).

The car 10 to which our invention is applied may be adapted to handle pulverant material, such as flour, as well as granular materials, by applying to the car 10 the inventive concepts described in said copending application Serial No. 796,603. As specified in said application, the side walls 80 and the sheets 86, 87 and 88 form downwardly inclined lines of intersection where indicated by arrows 200 and 202. These lines of intersection form corners 204 and 206 to which are applied plenum chambers 208 and 210, respectively. As best indicated in FIGURE 4, the plenum chambers are defined by a gas permeable material 212 that is fixed across the respective corners by continuous clips 214 welded to the respective car sheets, the sealed edges 213 of the material 212 being received under hooked edges 215 of the clips. As disclosed in said copending application, the upper and lower plenum chambers on either side of the car are connected by transition pieces 217 (not shown) welded to the car and the lower ends of the lower plenum chambers are closed by triangular plates 219 welded to the hopper-forming sheets. The ends of the respective strips of gas permeable material 212 are secured in place to the transition pieces and triangular plates closing off the plenum chambers by appropriate securing plates 216 held in place by screws 218. At the upper end of the plenum chambers 208, the gas permeable material is fixed in place by a plate 221 secured by screws to a plate (not shown) welded to the adjacent partition sheet 82.

The fabric material forming the gas permeable strips 212 preferably is 8 oz. duck canvasing and has a permeability that exceeds 10, as determined by the standard permeability test (13.9 being the permeability of the canvas material employed in a successful embodiment of said invention described in said copending application). The standard permeability test determines the amount of air measured in cubic feet at 70 degrees and 20 percent relative humidity which will pass through one square foot of dry permeable material in one minute when tested under an equivalent pressure differential of 2 inches of water.

As also described in said copending application, the plenum chambers are each connected to appropriate conduits 220 (shown only in FIGURE 4) that extend transversely of the car on either side of and between the funneling portions 16 of each hopper, which conduits on each hopper are connected together at the sides of the car by conduits 223 provided with inlet pipes 225 on either side of the car that are adapted to be connected to a source of air under pressure. Inlet pipes 225 are closed when not in use by a suitable closure such as pipe cap 222.

It will thus be seen that there are four corners 206 inclining downwardly towards the opening of each hopper funneling portion 16 and that a plenum chamber is formed across each of these corners. When the car 10 is used to carry pulverant materials such as flour, the unloader apparatus 32 is left inoperative and closed. To unload the pulverant material from the car 10, the hopper openings 24 are connected to a suitable conduit or storage hopper and the gates 26 opened, which permits a portion of the pulverant material to drop out through the individual hopper openings. As described in said copending application, this results in an arch being formed across the individual hopper openings, which will provide a cavern-like opening in the hopper below the plenum chambers 210. A source of air under pressure is then connected to the respective conduits 225 through which it passes into the respective plenum chambers (note the connecting pipes 227 indicated in dashed lines in FIGURE 4) and out through the gas permeable material. The strips of gas permeable material define band-like jets that are directed diagonally of the corners of the hopper funneling portions and converge at the center of the hopper funneling portion. The air emits from the respective gas permeable strips in a rapid flow which effects an immediate enlargement of the arch formed by the pulverant material, which disrupts the arch so that the center of the arch structure formed by the pulverant material falls through the hopper opening. Continued emission of the gas from the gas permeable strips prevents the arch-like structure from again forming.

The pulverant material then leaving the hopper funneling portions passes through the restricted openings 122 and through the respective hopper openings 24. The action of the air emitting from the gas permeable strips insures that the flour will be discharged through the hopper openings in spite of the presence of baffle plates 120 though if desired the adapter structure of each hopper funneling portion may be provided with plenum chambers similar to those described to prevent arching of the pulverant material across corners defined by the adapter structures.

Plenum chambers 208 may be connected to plenum chambers 210 directly through transition plates 217 or may be supplied with air from separate conduits, as disclosed in said copending application.

As specified in said copending application, air should be supplied to the individual plenum chambers at a minimum rate that is on the order of 12 cubic feet a minute per square foot of plenum chamber gas permeable area.

In the form 32a of FIGURE 3, the trunk conduit 34a is formed by two tubular members 230 connected together by a transition piece 158. This embodiment is otherwise the same as that previously described except that it is adapted for application to a two hopper car and like reference numerals indicate like parts. Further description is believed unnecessary.

Summary of Invention

It will therefore be seen that we have provided a simplified and efficient apparatus for pneumatically unloading granular materials from hopper cars. The invention is applicable for handling all forms of granular materials that have a particle size which adapts them for mass movement by air. Examples have already been given.

An important advantage of the invention is that it provides a one point discharge convenient to both sides of the car. Thus, one connection of the suction supplying hose to the car will discharge all of the hoppers, and this may be done either simultaneously or selectively by appropriately operating the valves in the individual hopper funneling portions. Furthermore, since the discharge conduits 48 terminate well short of the sides of the car, the suction supplying hose 66 may be attached to the unloader apparatus without any awkward bending action being necessary.

While it will ordinarily be preferable to discharge the car hoppers from either one of the discharge conduits 48 the entire car may also be discharged from one of the outwardly projecting ends of the feeder conduits 36 and this may be done by merely attaching the suction supplying hose to the appropriate feeder conduit. Again, any one of the hoppers or hopper funneling portions may be discharged from any one of the feeder conduits 36 by appropriately operating the respective funneling portion valves.

Tests have shown that the "controlled mixture" type of discharge operation additionally referred to is not required when operating unloader apparatus 32 or 32a, particularly where the suction is applied to all hoppers simultaneously as would ordinarily be the case (the reason is that the suction is applied over a sufficient area to preclude any choking action and the air flow required to entrain the material being unloaded comes through such material).

The car seals required by the disclosed arrangement can be considerably less in number as compared to conventional covered hopper cars having the conventional loading and unloading arrangements applied thereto. This is particularly so if the caps 52 are permanently affixed to the ends of feeder conduits 36 rather than being removably secured thereto (see FIGURE 11 wherein cap 52a is welded to conduit 104 as at 240). Since car seals are ordinarily applied to hopper car hatches or outlet openings, such an arrangement would require car seals only at the ends of discharge conduits 48 and the hatch openings in the hopper car roof.

Where unloader apparatus 38 is applied to a car embodying the inventions described in said copending application, the same car will handle both granular and powdered or pulverant materials.

The foregoing description and the drawings are given merely to explain and illustrate our invention and the invention is not to be limited thereto, except insofar as the appended claims are so limited, since those skilled in the art who have our disclosure before them will be able to make modifications and variations therein without departing from the scope of the invention.

We claim:

1. A pneumatic discharge device for hopper structures including a funneling portion provided with a discharge gate at the lower end thereof, said device comprising a generally horizontal tubular member extending crosswise of the funneling portion above the gate, said tubular member being formed with an orifice in the lower portion thereof, a depending wall structure secured in circumambient relation about said orifice and applied in sealing relation with said tubular member, said wall structure extending short of the gate, valve means operably mounted within said wall structure for opening and closing said orifice, and means for connecting said tubular member to a source of vacuum.

2. The device set forth in claim 1 wherein said valve means comprises a valve member that is proportioned to cover said orifice, means for actuating said valve member to move same between a position wherein it covers said orifice to a position wherein it is disposed to one side of said orifice, and means for selectively holding said valve member in each of said positions.

3. The device set forth in claim 2 wherein the means for holding said valve member in its said positions comprises a generally horizontal rod structure operatively connected with said valve member, an elongate handle member fixed to said rod structure in depending relation therewith, a bracket structure mounted adjacent said handle member and formed with elongate upwardly inclined slot means, and a wedge member slidably mounted in said slot means, said handle member being biased against said wedge member by gravity, the relationship between said handle member and said slot means being such that said wedge member holds said handle member in the positions necessary to give the desired positioning of said valve member, said handle member forming said means for actuating said valve member.

4. Apparatus for pneumatically unloading granular materials from a railroad hopper car structure including contiguous hoppers each including spaced funneling portions at the lower ends thereof each controlled by a discharge gate with the hoppers arranged so that the funneling portions on like sides of the hoppers are disposed in parallel rows on either side of the longitudinal center of the car, said apparatus comprising a trunk conduit extending between the rows of funneling portions and including means for connecting same to a source of vacuum, a feeder conduit for each funneling portion and connected between the trunk conduit and the respective funneling portions, said feeder conduits extending transversely of the car and each connecting a single funneling portion to said trunk conduit, said feeder conduits each comprising a tubular member extending crosswise of the funnelng portion to which the feeder conduit is attached, said tubular member being formed with an orifice in the lower portion thereof, a depending wall structure secured in circumambient relation about said orifice and applied in sealing relation with said tubular member, said wall structure extending short of the gate, and valve means operatively mounted within said wall structure for opening and closing said orifice.

5. The apparatus set forth in claim 4 wherein the means for connecting said trunk conduit to a source of vacuum comprises a further conduit fixed to said trunk conduit and extending transversely of the car, said further conduit extending short of the funneling portions on the side of the car on which it is disposed.

6. The apparatus set forth in claim 4 wherein an inclined baffle plate is fixed in the respective funneling portions on either side of said tubular member thereof, said baffle plates being inclined downwardly in the direction of the respective tubular members, and being spaced from the respective tubular members at their lower ends.

7. The apparatus set forth in claim 5 wherein the ends of said tubular members and said further conduit that project outwardly of the car are provided with removable cap means including means for sealingly closing said ends of said tubular members and said further conduit, said ends of said tubular members and said further conduit forming said means for connecting said trunk conduit to a source of vacuum.

8. The apparatus set forth in claim 5 wherein the ends of said tubular members that project outwardly of the car are permanently sealed against gas leakage, and wherein the end of said further conduit that projects outwardly of the car is provided with removable cap means including means for sealingly closing said end of said further conduit, said end of said further conduit forming said means for connecting said trunk conduit to a source of vacuum.

9. The method of unloading granular materials of the type when contained in bulk, form interconnected air spaces through the contained material, from a hopper structure including contiguous hoppers each including spaced funneling portions at the lower ends thereof, with the hoppers arranged so that the funneling portions on like sides of the hoppers are disposed in parallel rows on either side of the longitudinal center of the hopper structure, said method including simultaneously and undilutedly applying a source of vacuum to the lower ends of each of said funneling portions to draw from the respective hoppers the granular material contained therein and to draw through the granular material the air necessary to convey the granular material leaving said funneling portions, under the head afforded by the source of vacuum, and disconnecting the respective funneling portions from the source of vacuum as they become emptied.

10. A railroad hopper car structure for carrying both granular and pulverant materials comprising a plurality of contiguous hoppers, each of said hoppers including spaced funneling portions at the lower ends thereof with said hoppers arranged so that the funneling portions on like sides of the hoppers are disposed in parallel rows on either side of the longitudinal center of the car, said funneling portions each being defined by upright planar side walls and planar downwardly inclined bottom surfaces that lead from the side walls to a discharge port formed in the lower ends of said funneling portions, said surfaces forming downwardly inclined lines of intersection in each funneling portion defining corners, said corners each having a gas permeable material applied thereacross to define a plenum chamber between said material and the respective corners, said permeable material having a permeability that exceeds 10, and said funneling portions each including means for supplying gas under pressure to said plenum chambers to break up the arch formed by pulverant material over the respective discharge ports, gate means for each funneling portion for opening and closing the respective discharging ports, and apparatus for pneumatically unloading granular material from said hoppers when said gate means are closed, said apparatus comprising a trunk conduit extending between the rows of funneling portions and including means for connecting same to a source of vacuum, a feeder conduit for each funneling portion and connected between the trunk conduit and the respective funneling portions, said feeder conduits extending transversely of the car and each connecting a single funneling portion to said trunk conduit, said feeder conduits each comprising a tubular member extending crosswise of the funneling portion to which the feeder conduit is attached, said tubular members each being formed with an orifice opening in the lower portion thereof, a depending wall structure secured in circumambient relation about said orifice opening and applied in sealing relation with the respective tubular members, said wall structure of each funneling portion extending short of the discharge port thereof, and valve means operatively mounted within the respective wall structures for opening and closing said orifice openings, respectively.

11. In a hopper structure for bulk materials including a funneling portion having a discharge controlling gate at the lower end thereof, pneumatic discharge apparatus therefor comprising a tubular member extending crosswise of the funneling portion above the gate thereof, said tubular member being formed in the portion thereof that is within the funneling portion with an orifice in the lower portion thereof, valve means for opening and closing said orifice, means for shielding said valve means from the bulk material, means for opening and closing said valve means exteriorly of the funneling portion, and means for securing said tubular member to a source of vacuum.

12. Apparatus for pneumatically unloading bulk materials from a railroad hopper car structure including contiguous hoppers each including spaced funneling portions at the lower ends thereof controlled by discharge gates provided with gravity ports with the hoppers arranged so that the funneling portions on like sides of the hoppers are disposed in parallel rows on either side of the longitudinal center of the car, said apparatus comprising a trunk conduit extending between the rows of funneling portions and including means for connecting same to a source of vacuum, a feeder conduit for each funneling portion and connected between the trunk conduit and the respective funneling portions, said feeder conduits extending transversely of the car and each connecting a single funneling portion to said trunk conduit, said feeder conduits each comprising a tubular member extending crosswise of and into the funneling portion to which the feeder conduit is attached and above the gate thereof, said tubular members in the portions thereof that are disposed within the respective funneling portions each being formed with an orifice opening, means for selectively opening and closing said orifice openings, said means for connecting said trunk conduit to a source of vacuum comprising a further conduit fixed to said trunk conduit and extending transversely of the car, said further conduit extending short of the side of the car on which it is disposed.

13. Pneumatic discharge apparatus for a hopper structure including a pair of spaced funneling portions each provided with a discharge gate at the lower end thereof, said apparatus comprising a trunk conduit extending between the two funneling portions and including means for connecting same to a source of vacuum, a feeder conduit for each funneling portion and connected between the trunk conduit and the respective funneling portions, said feeder conduits each connecting a single funneling portion to said trunk conduit, said feeder conduits each comprising a tubular member extending crosswise of the funneling portions to which the respective feeder conduit is attached, said tubular members each being formed with an orifice in the lower portion thereof, a depending wall structure mounted in each funneling portion with the respective wall structures secured in circumambient relation about the respective orifices and applied in sealing relation with the respective tubular members, and valve means operatively mounted within the respective wall structures for opening and closing said orifices, respectively.

References Cited in the file of this patent

UNITED STATES PATENTS

| | | |
|---|---|---|
| 835,409 | Dillon | Nov. 6, 1906 |
| 2,030,553 | Tiley | Feb. 11, 1936 |
| 2,368,396 | Allen | Jan. 30, 1945 |
| 2,650,726 | Aller | Sept. 1, 1953 |
| 2,858,165 | Oliver | Oct. 28, 1958 |
| 2,919,158 | Aller | Dec. 29, 1959 |
| 2,926,963 | Dorey | Mar. 1, 1960 |